Nov. 28, 1950

J. R. CARLIN ET AL 2,531,804

MEASUREMENT OF THE INTENSITY
OF PENETRATIVE RADIATIONS

Filed Sept. 24, 1949

INVENTORS
Jack R. Carlin and
Eric T. Clarke
BY William R. Hulbert Jr.
ATTORNEY

Patented Nov. 28, 1950

2,531,804

UNITED STATES PATENT OFFICE 2,531,804

MEASUREMENT OF THE INTENSITY OF PENETRATIVE RADIATIONS

Jack R. Carlin, Watertown, and Eric T. Clarke, Cambridge, Mass., assignors to Tracerlab, Inc., Boston, Mass., a corporation of Massachusetts Application September 24, 1949, Serial No. 117,621

14 Claims. (Cl. 250—83.6)

Our invention relates to the measurement of the intensity of penetrative radiations such as emanate from radioactive materials. More particularly it is concerned with a new and improved apparatus for the accurate measurement of the intensity of such radiations over a very wide range of radiation intensities, making use of an ion chamber, and associated electrical circuit, of novel and improved construction.

An ion chamber (also called an ionization chamber) is basically a cavity or sensitive volume containing some ionizable medium. The usual ionization chamber has contained within the volume a pair of electrodes across which is impressed a difference of electrical potential. Upon irradiation of the chamber, the ions, which may be formed by several known processes, are caused to drift to the collecting electrodes, thereby establishing a small current, called the ionization current, which can be measured directly by electrometers or electroscopes, or amplified by suitable means to operate a current meter or any other indicating or control device.

When no potential is impressed upon the electrodes and the chamber is subjected to ionizing radiations, the medium contained therein will become ionized. That is to say, electrons will be knocked free from the atoms of the gaseous medium thereof leaving the atoms or molecules as positively charged ions. Without the influence of charged electrodes the positive ions and electrons will move about at random until they recombine to form stable neutral atoms again but no ionization current will develop. With the impression of a voltage on the electrodes, a collecting electric field is established in the chamber which causes the positive ions, for example, to move through the gas chamber to the negatively charged electrode where their charges may be neutralized. As the value of the voltage impressed is increased, recombination effects become progressively reduced until sufficient field is established to discourage recombination entirely. At this point the ions are swept out of the field immediately upon formation; the transit time of the charged particles to the electrode has been reduced sufficiently by the accelerating electric field so that the probability of recombination becomes negligible. The ionization current will now have reached a saturation value which is independent of additional voltage increments over a wide range. It is in this characteristic saturated region, yielding a so-called saturation current, that an ion chamber is usually operated, for in this region the magnitude of the chamber current or response then depends almost entirely upon the intensity of the ionizing radiations to which the chamber is subjected and the chamber response will be virtually linear.

Since the probability of recombination depends also upon the density of ions present, which controls in part the frequency of encounters between ions, if the radiation intensity is very high, the existing electric field may not be strong enough to sweep all the ions out before appreciable recombination occurs. Should this occur, according to the usual practice, it is considered necessary to increase the potential applied to the electrodes until the electric field is again of sufficient magnitude to yield a saturation ionization current.

Likewise, the density of ions present depends in part upon the pressure of the ionization medium which is usually an inert gas. As the medium is made more dense, because of increased pressure, the density of ions produced by a given intensity of radiation and the corresponding frequency of recombination will thereby be increased, and, again, it may be necessary to impress a higher voltage to insure a saturation current.

It will be evident from a consideration of the foregoing properties of the usual ion chamber, that if such a chamber were designed for operation over a range of one milliroentgen per hour (1 mr./hr.) through one million milliroentgens per hour (1,000,000 mr./hr.), it would give a current output which would vary by a factor of a million to one, since the response would be linear. Consequently, in order to provide reasonable reading accuracy, the output galvanometer would have to be equipped with a scale changer to divide the operating range (1 to 1,000,000 mr./hr.) into five or six separate ranges.

Furthermore, it will be seen that in order to secure a linear response (i. e. a saturation current) at higher radiation intensities, undesirably high voltages, of the order of thousands of volts, would have to be used in order to reduce the recombination of ions to zero. The maximum permissible potential is of course limited by the insulating properties of the ionizing medium and must not reach a value which would cause arcing between the electrodes.

We have found that the foregoing difficulties may be overcome and that useful and accurate measurements may be obtained, according to the invention, employing an ion chamber of novel construction and using voltages well below the saturation level, yielding predictable, although non-linear results over an extremely wide range of radiation intensity.

The principal object of our invention is to provide a new and improved apparatus for measuring accurately the intensity of penetrative radiations, such as those emanating from radioactive substances, over an extremely wide range of radiation intensities.

Another object of the invention is to provide an apparatus for the accurate measurement of such radiations making use of an ion chamber operating at very low voltages, well below the saturation level.

Still another object of the invention is to provide means for measuring the intensity of ionizing radiations yielding a non-linear and preferably logarithmic result so that the radiations varying extremely in intensity may be measured with equivalent accuracy on the same instrument.

One of the features of the invention is the employment of the ionization current developed in an ion chamber in such a manner as to reduce the strength of the collecting electric field as the intensity of radiation to which the chamber is subjected increases.

Another feature of the invention is the provision of an ion chamber having a sensitive volume containing charged electrodes and a corresponding electrical circuit associated therewith in which the ionization current is allowed to flow through a resistor to build up a voltage in opposition to the electromotive force supplied to the electrodes, thus reducing the collecting electric field in the sensitive volume as the intensity of radiation to which the chamber is subjected increases.

A further feature of the invention is the provision of an ion chamber having two sensitive volumes in which the ionization current collected in one of the volumes is used to develop the collecting electric field for the other volume. Since the ionization current then resulting from the second volume is opposite in direction to that from the first volume, the total current collected is reduced not only because of the reduction in collecting voltage in the first volume but also because of the bucking effect of the current from the second volume.

Still other objects, features and advantages of the invention will become evident from the following detailed description of a preferred embodiment of the invention taken in connection with the accompanying drawings, in which like numerals refer to like parts in the several views and in which.

Figure 1:
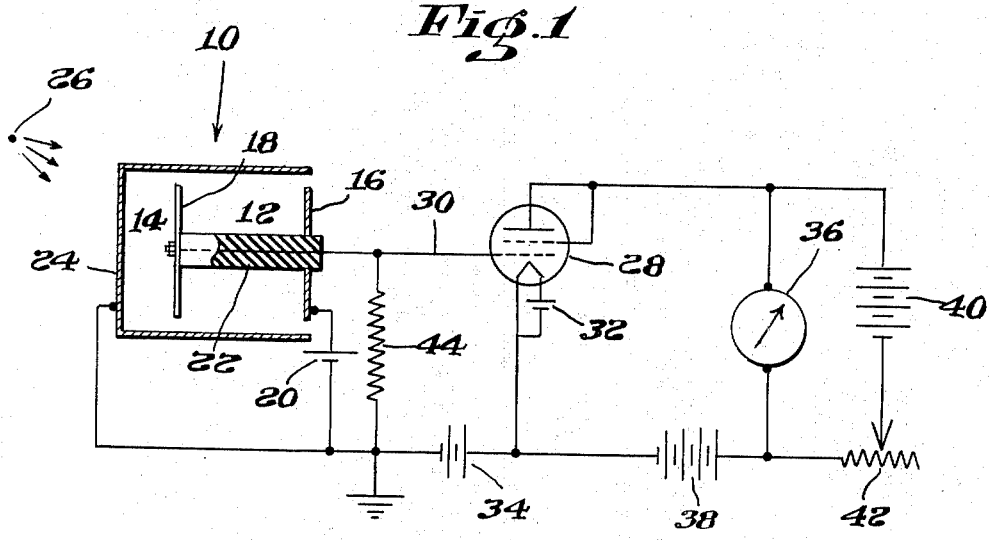
Fig. 1 is a diagrammatic representation of an ion chamber illustrating the two sensitive volumes of the invention and the accompanying electrical circuit.
Figure 2:
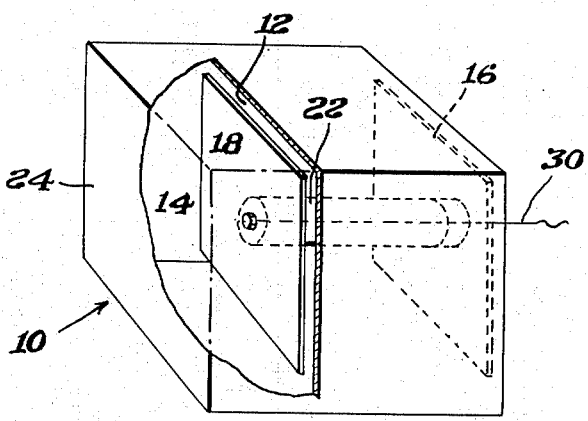
Fig. 2 is a view of the ion chamber of the invention with portions broken away showing the two sensitive volumes thereof.

Referring to Figs. 1 and 2, the numeral 10 indicates generally the ionization chamber which has a principal sensitive volume 12 and a secondary sensitive volume 14, said volumes being filled to any desired pressure with an ionizing medium such as a gaseous substance. An inert gas under atmospheric pressure has been found suitable for many purposes. An electrical field is impressed upon the primary sensitive volume 12 by means of the positively charged electrode 16 and the negatively charged electrode 18. The electromotive force $E_c$ for charging these electrodes is provided by a small battery 20. The electrodes 16 and 18 are suitably mounted in a manner well known in the art, insulated from one another by the insulator 22.

The secondary collecting volume 14 is subjected to the influence of the electrode 18 and a third electrode 24 which consists of the end wall of the apparatus. In a manner hereinafter more fully explained, initially there is created an electric field only between the electrodes 16 and 18 and there is no potential difference between the electrodes 18 and 24. In consequence, when the chamber is subjected to ionizing radiations emanating from a radio-active source 26, the gaseous medium in the volumes 12 and 14 will become ionized. In the volume 12, because of the accelerating effect on the charged particles of the electric field, the ions will begin to drift toward the electrodes and a small ionization current will begin to flow in the exterior circuit. Since no collecting electric field exists initially in the volume 14, the gaseous medium therein will become ionized but the ions developed will circulate at random and be lost through recombination processes without migrating to either electrode. The function and operation of the secondary volume 14 will hereinafter be more fully explained.

In order to measure the output of the ion chamber, there is further provided an amplifying circuit and meter, shown diagrammatically in Fig. 1, to measure the net ionization current developed. We have found entirely suitable the simple circuit shown, although it will be evident that the resulting current may be measured and displayed by other means well known in the art. A vacuum tube 28, in this case a CK571AX, has its grid connected by means of a conductor 30 to the collecting electrode 18. The cathode of the tube 28, heated by a 1.5 v. battery 32, is connected through a 3 v. battery 34 to the ground in order to provide the required operating bias for the tube. The anode of the tube 28 is connected to a suitable galvanometer or current meter 36. The output circuit of the tube 28 includes a 10.5 v. battery 38 supplying the plate current. The meter 36 may be adjusted to zero by the provision of an additional 10.5 v. battery 40 connected in series with a variable 200,000 ohm resistor 42, in the meter circuit.

There is further provided a resistor 44 having a very high resistance, in this case $3 \times 10^{11}$ ohms, which serves to carry the collected ionization currents developed in the sensitive volumes 12 and 14. The resistor 44 is connected between the negative side of the battery 20 and the electrode 18 and consequently the voltage developed across the resistor 44 opposes the voltage $E_c$ of the battery 20, thus weakening the electric field produced by the electrodes 16 and 18.

The voltage appearing across the resistor 44 also is connected to the electrode 24, thus establishing an electric field in the secondary sensitive volume 14. The ionization current flowing as a result of the electric field in the volume 14 produces a voltage across the resistor 44 which is opposite in sign to that developed in the chamber 12, thus further weakening the net ionization current flowing in the resistor 44. The fluctuating voltage appearing across this resistor reaches the amplifier to be displayed by the meter 36, such voltage, by well known electrical laws, being a measure of net ionization current flow.

The operation of the device may then be described as follows: initially without the presence of a radiation field the principal collecting volume 12, between the electrodes 16 and 18, contains an electric field produced by the battery 20 of voltage $E_c$. The secondary collecting volume 14 between the electrodes 18 and 24 does not initially contain an electric field.

If now a source of ionizing radiations 26 be brought near the instrument, or any other method is used to produce a radiation field in the chamber, ionization of the chamber gas will result. Since no collecting electric field exists in the volume 14, all the ions developed there will be lost through recombination processes. However, in the volume 12 bounded by the electrodes 16 and 18, the presence of the electric field produced by the voltage $E_c$ causes a drift of ions to the electrodes thereby establishing a small ionization current which flows across the resistor 44. The ionization current flow is not directly proportional to the intensity of the radiation field since $E_c$ represents a voltage of, for example, 1 to 4 volts, which is far below that required for saturation. In addition, the voltage developed across the resistor 44 due to this small current flow opposes the battery 20 and results in lowering the voltage applied to the electrodes 16 and 18 below the value $E_c$, resulting in smaller and smaller collecting fields being applied to the volume 12 with greater radiation field intensities. In this way decreasing voltage increments across the resistor 44, and hence the amplifier's response, will result due to additional increments in radiation intensity. Thus far the response in general, however, is not wholly logarithmic since the instrument still responds too strongly to increasing radiation fields.

However, further decreasing increments in amplifier response due to corresponding increases in radiation intensity result from the appearance of the small voltage across the resistor 44, since this voltage also establishes a collecting electric field in the volume 14 between the electrodes 18 and 24. The ionization current flow in this part of the chamber develops a voltage across the resistor 44 of opposing polarity to that developed between the electrodes 16 and 18, still further reducing the net ionization current reaching the amplifier circuit.

Figure 3:
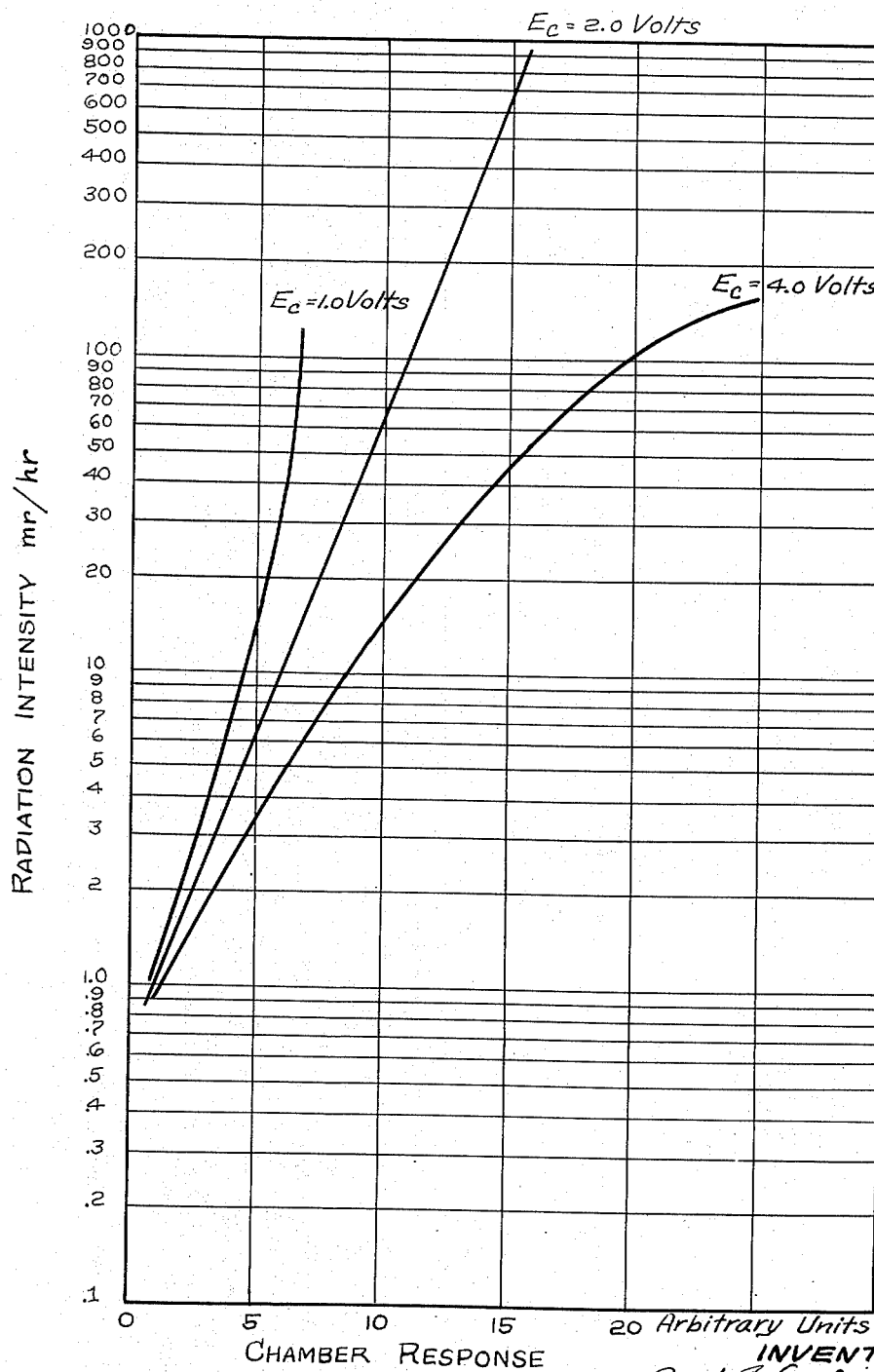
Fig. 3 is a chart showing the chamber response of the embodiment of the invention herein disclosed in arbitrary units as compared with radiation intensity in mr./hr. for different voltages, $E_c$, initially applied to the electrodes of the principal sensitive volume.

By proper adjustments of the ratio between the two collecting volumes, of the voltage $E_c$ of the battery 20 and of the resistance value of the resistor 44, various non-linear chamber responses can be achieved as indicated in the chart of Fig. 3. The data for the chart were obtained using an ion chamber of an overall length of six inches and five inches square in cross-section. The central electrode 18 was placed two inches from the electrode 16.

Referring now to Fig. 3 it will be observed that with the foregoing chamber dimensions when the resistor 44 has a value of $3 \times 10^{11}$ ohms, a logarithmic response may be achieved with a battery 20 having a voltage $E_c$ of only two volts, as compared with a saturation voltage which may be from 50 to 1,000 volts. If $E_c$ is one volt or four volts, the response curve is not wholly logarithmic. We prefer to adjust the apparatus to yield a logarithmic response so that the meter 36 may be more readily calibrated to display the radiation intensity. As will be evident from the chart of Fig. 3, a logarithmic chamber response, here shown in arbitrary units, will vary by only a factor of three while the radiation intensity will vary by a factor of one thousand.

The apparatus will show the same type of response to high radiation intensities as to low. The voltages necessary for successful operation of the ion chamber of the invention are of the order of that produced by two dry cells. Likewise, the source of electric power to operate the amplifier is simple, consisting of two 10.5 v. batteries and a 3 v. battery. Consequently, the apparatus of the invention is simple to construct, having few parts and requiring no high voltage sources or high voltage insulation, and the radiation intensities may be read directly on a single meter which is calibrated on a logarithmic scale.

The apparatus of our invention is useful in measuring all types of penetrative radiations which will cause ionization of the gaseous atmosphere of the chamber. In the event that it is desired to measure the intensity of radiation of non-ionizing particles such as neutrons, the collecting electrodes may be provided with a suitable coating, such as boron carbide, which will emit alpha particles when bombarded by neutrons, the chamber being sensitive to these secondary radiations.

While we have herein disclosed the invention in preferred form, it will nevertheless be understood that the same is susceptible of changes and modifications by persons skilled in the art within the spirit and scope of the appended claims.

We claim:

1. In apparatus for measuring the intensity of penetrative radiations such as are emitted by radioactive substances, the combination comprising: an ion chamber, a pair of electrodes mounted in said chamber, a source of low voltage arranged to impress a collecting voltage on said electrodes such as to produce an ionization current well below saturation value, a connection from one of said charged electrodes to carry said ionization current, means for employing said ionization current to reduce the total ionization current developed, and means for measuring the ionization current so reduced.

2. In apparatus for measuring the intensity of penetrative radiations such as are emitted by radioactive materials, the combination comprising: an ion chamber, a pair of electrodes mounted in said chamber, a source of low voltage arranged to impress a collecting voltage of less than saturation value on said electrodes, a resistor connected between one of said charged electrodes and said voltage source to carry said ionization current, the voltage appearing across said resistor being in opposition to that of said voltage source thereby reducing said collecting voltage, and means for measuring the ionization current produced by said reduced collecting voltage.

3. In an apparatus for measuring the intensity of penetrative radiations such as are emitted by radioactive materials, the combination comprising: an ion chamber having principal and secondary sensitive volumes, electrodes mounted in each said volume, a source of low voltage arranged to charge the electrodes of the principal collecting volume so as to produce an ionization current below saturation value, a connection from one of said charged electrodes to permit said ionization current to charge the electrodes of the secondary sensitive volume and develop a collecting electric field therein, the ionization current of said secondary volume being in opposition to the current developed by the principal volume and tending to oppose the flow thereof, and means for measuring the net ionization current produced.

4. Apparatus of the ion chamber type for measuring the intensity of penetrative radiations such as are emitted by radioactive materials which comprises: electrodes defining principal and secondary sensitive volumes, a low voltage source arranged to charge the electrodes of said principal volume with a low collecting voltage to develop a less than saturation initial ionization current, a resistor between one of the electrodes of said principal volume and said voltage source carrying said current, the voltage appearing across said resistor as a result of the flow of said current being opposed to that of said voltage source thereby lowering the charge of said electrodes and correspondingly reducing the said current flowing in said resistor, a connection permitting said voltage appearing across said resistor to charge the electrodes of said secondary sensitive volume, said connection permitting the ionization current of said secondary volume to flow in said resistor in opposition to said initial current further reducing the same, and means for measuring the net ionization current flowing in said resistor.

5. Apparatus according to claim 4, in which the low voltage source is of the order of 2 to 4 volts and the resistor has a value of the order of $3.10^{11}$ ohms.

6. Apparatus according to claim 4, in which the dimensions of the sensitive volumes, the value of the low voltage source and the resistance of the resistor are so adjusted that the net ionization current will vary as a logarithmic function of the intensity of the penetrative radiations being measured.

7. Apparatus according to claim 4 in which said electrodes comprise a single electrode in each of said volumes and a common electrode separating the two volumes.

8. In apparatus of the ion chamber type for measuring the intensity of penetrative radiations such as are emitted by radioactive substances, the combination which comprises: electrodes defining primary and secondary sensitive volumes, the electrodes of the primary volume being arranged to be charged with a low collecting voltage so as to produce an ionization current well below saturation level, a connection permitting said current to charge the electrodes of said secondary volume, the ionization current of said secondary volume being of opposite polarity to that of the ionization current of said primary volume and tending to oppose the flow thereof.

9. In apparatus of the ion chamber type for measuring the intensity of penetrative radiations such as are emitted by radioactive substances, the combination comprising: electrodes defining primary and secondary sensitive volumes, the electrodes of said primary volume being arranged when charged to produce a collecting electric field yielding an ionization current below saturation level, a connection permitting said current to charge the electrodes of the said secondary volume the ionization current of the latter being of opposite polarity to that of the ionization current of said primary volume and tending to oppose the flow thereof, and a resistor connected to one of the electrodes of said primary volume and arranged to carry the ionization current thereof, the voltage appearing across said resistor being opposed to the collecting voltage applied to said primary volume reducing the collecting electric field and the resultant ionization current thereof.

10. For use with apparatus for measuring the intensity of penetrative radiations said apparatus having a source of voltage and a device for measuring net ionization current flow, an ion chamber assembly yielding a net ionization current varying as a non-linear function of the intensity of said radiations which comprises: a pair of electrodes defining a sensitive volume, said electrodes being arranged to be charged with a collecting voltage such as to produce an initial ionization current well below saturation value, a connection from one of said electrodes to carry said current, and means for employing said initial ionization current to reduce the total ionization current developed to a lower net value.

11. In apparatus of the ion chamber type for measuring the intensity of penetrative radiations such as are emitted by radioactive substances said apparatus having two sensitive volumes for operation well below saturation level, connections for employing the output of one of said volumes to provide the collecting electric field for the other of said volumes, the output of the latter volume being so connected as to oppose and reduce the output of the former volume whereby the net output of said former volume will vary as a non-linear function of the intensity of the penetrative radiations being measured.

12. In apparatus of the ion chamber type for measuring the intensity of penetrative radiations such as are emitted by radioactive materials, said apparatus having two sensitive volumes arranged to contain collecting electric fields of well below saturation intensities, the combination which comprises: electrical connections for employing the output of one of said volumes to reduce the strength of the collecting field of said volume and the resulting output thereof and electrical connections for employing said output to provide the collecting electric field of the other of said volumes, the output of the latter volume being so connected as to oppose and still further reduce the output of the former volume, whereby the net output of said former volume will vary as a non-linear function of the intensity of the penetrative radiations being measured.

13. For use with apparatus for measuring the intensity of penetrative radiations said apparatus having a source of voltage and a device for measuring net ionization current flow, an ion chamber assembly yielding a net ionization current varying as a non-linear function of the intensity of said radiations which comprises: a pair of electrodes defining a sensitive volume, said electrodes being arranged to be charged with a collecting voltage such as to produce an initial ionization current well below saturation value, a connection from one of said electrodes to carry said current, and means for employing said initial ionization current to reduce the total ionization current developed to a lower net value, said means including a circuit for directing said initial ionization current in opposition to said collecting voltage.

14. For use with apparatus for measuring the intensity of penetrative radiations said apparatus having a source of voltage and a device for measuring net ionization current flow, an ion chamber assembly yielding a net ionization current varying as a non-linear function of the intensity of said radiations which comprises: a pair of electrodes defining a sensitive volume, said electrodes being arranged to be charged with a collecting voltage such as to produce an initial ionization current well below saturation value, and an electrical circuit connected to said electrodes for employing said initial ionization current to reduce the total ionization current developed to a lower net value.

JACK R. CARLIN.
ERIC T. CLARKE.

REFERENCES CITED

The following references are of record in the file of this patent:

FOREIGN PATENTS

| Number | Country | Date |
| --- | --- | --- |
| 340,231 | Great Britain | Dec. 12, 1930 |

Certificate of Correction

Patent No. 2,531,804                                  November 28, 1950

JACK R. CARLIN ET AL.

It is hereby certified that error appears in the printed specification of the above numbered patent requiring correction as follows:

Column 3, line 18, for the word "supplied" read *applied*; column 7, line 17, for "$3.10^{11}$" read *$3 \times 10^{11}$*; line 61, after "volume" insert *thereby*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*